US010214373B2

(12) United States Patent
Sata

(10) Patent No.: US 10,214,373 B2
(45) Date of Patent: Feb. 26, 2019

(54) SHEET FEEDING DEVICE AND IMAGE FORMING APPARATUS

(71) Applicant: CANON KABUSHIKI KAISHA, Tokyo (JP)

(72) Inventor: Junichi Sata, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/727,009

(22) Filed: Oct. 6, 2017

(65) Prior Publication Data

US 2018/0099825 A1 Apr. 12, 2018

(30) Foreign Application Priority Data

Oct. 12, 2016 (JP) .................. 2016-200581

(51) Int. Cl.
| | |
|---|---|
| *B65H 3/56* | (2006.01) |
| *B65H 3/34* | (2006.01) |
| *B65H 3/06* | (2006.01) |
| *B65H 5/06* | (2006.01) |
| *G03G 15/00* | (2006.01) |
| *G06K 15/16* | (2006.01) |
| *H04N 1/00* | (2006.01) |
| *B65H 29/12* | (2006.01) |

(52) U.S. Cl.
CPC ............ *B65H 3/34* (2013.01); *B65H 3/0607* (2013.01); *B65H 3/0684* (2013.01); *B65H 3/565* (2013.01); *B65H 5/062* (2013.01); *G03G 15/602* (2013.01); *G03G 15/6511* (2013.01); *G06K 15/16* (2013.01); *H04N 1/00* (2013.01); *B65H 29/125* (2013.01); *B65H 2403/51* (2013.01); *B65H 2407/21* (2013.01); *B65H 2513/511* (2013.01); *B65H 2513/512* (2013.01); *B65H 2801/06* (2013.01); *G03G 15/5008* (2013.01)

(58) Field of Classification Search
CPC .................................. B65H 3/56; B65H 3/565
USPC ........................................ 271/121, 122, 124
See application file for complete search history.

(56) References Cited

U.S. PATENT DOCUMENTS

| | | | |
|---|---|---|---|
| 4,953,037 | A | 8/1990 | Ito et al. |
| 5,209,465 | A | 5/1993 | Sayama et al. |
| 5,551,684 | A | 9/1996 | Sata |

(Continued)

FOREIGN PATENT DOCUMENTS

| | | |
|---|---|---|
| JP | 2001199559 A | 7/2001 |
| JP | 2009-249089 A | 10/2009 |

*Primary Examiner* — David H Bollinger
(74) *Attorney, Agent, or Firm* — Venable LLP

(57) ABSTRACT

A sheet feeding device comprising: a stacking member on which a sheet is stacked; a first conveying portion that conveys a sheet stacked on the stacking member; a second conveying portion that separates and conveys a sheet conveyed by the first conveying portion; a stopper member that stops a sheet whose front end is abutted against the stopper member at an upstream of the second conveying portion in a sheet conveying direction, wherein the stopper member can be at a first position where the sheet can be stopped and a second position where the sheet can pass the stopper member, and wherein the stopper member can move from the first position toward the second position such that a sheet conveyed by the first conveying portion reaches the second conveying portion while maintaining a state where the front end of the sheet is abutted to the stopper member.

16 Claims, 11 Drawing Sheets

(56) References Cited

U.S. PATENT DOCUMENTS

| | | | |
|---|---|---|---|
| 5,572,308 A | 11/1996 | Suda et al. | |
| 2007/0262511 A1* | 11/2007 | Ohshima | B65H 3/56 271/10.01 |
| 2010/0244368 A1* | 9/2010 | Lin | B65H 3/0684 271/121 |

* cited by examiner

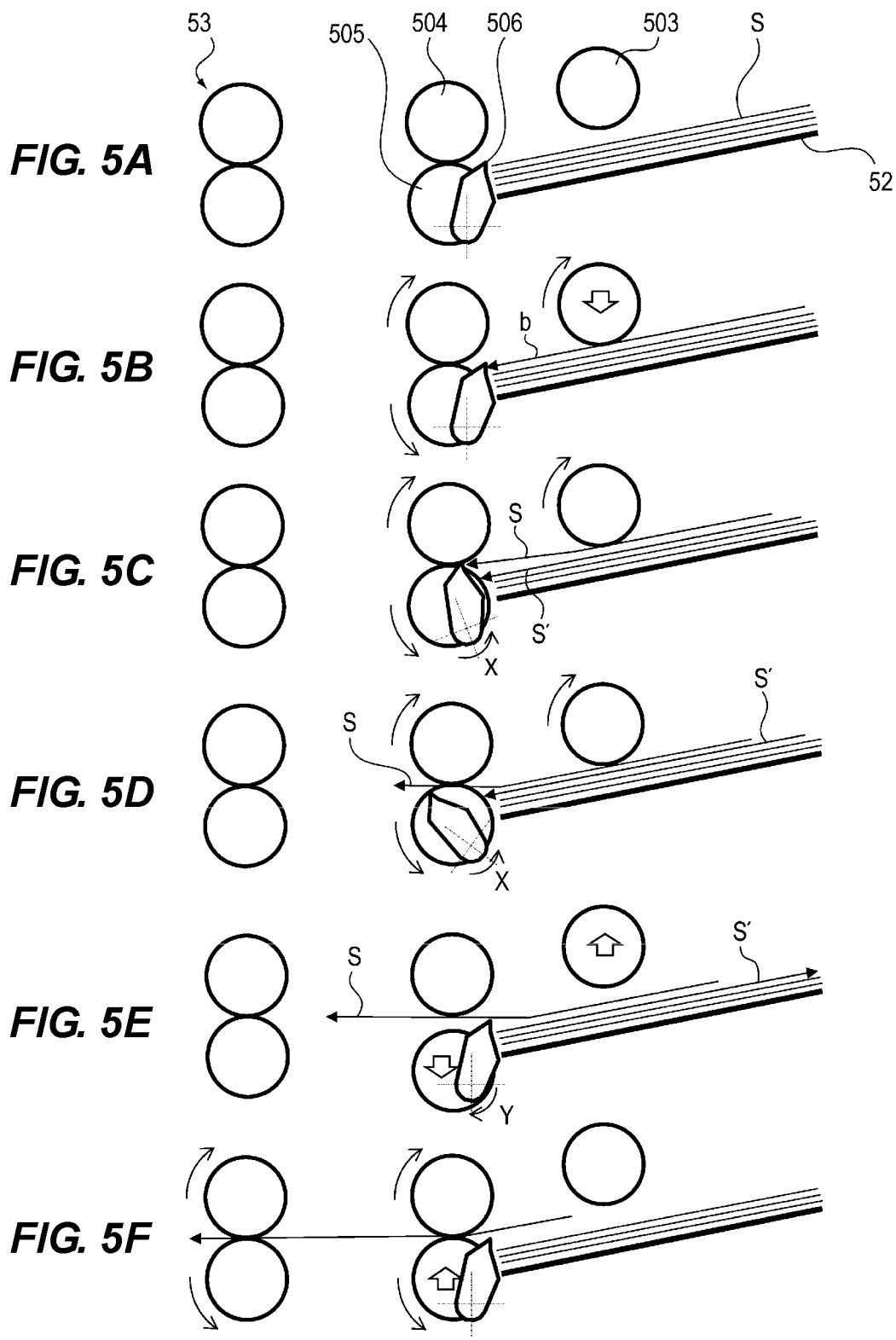

SHEET FEEDING DEVICE AND IMAGE FORMING APPARATUS

BACKGROUND OF THE INVENTION

Field of the Invention

The present invention relates to a sheet feeding device that individually separates and feeds a sheet, and an image forming apparatus, such as a copying machine or a printer, provided with the sheet feeding device.

Description of the Related Art

Conventionally, in a sheet feeding device mounted on an image forming apparatus such as a printer, a facsimile machine, or a copying machine, as disclosed in Japanese Patent Laid-Open No. 2009-249089 and Japanese Patent Laid-Open No. 2001-199559, there is used a separating mechanism that individually separates a sheet stacked in a storage case or the like. As the separating mechanism, a retard separating mechanism using a feed roller and a retard roller that form a pickup roller and a separation portion, and a separating mechanism using a separating member (a separation roller or a friction pad) and a feed roller serving also as a pickup and a feeding function are often used.

A paper feeder of Japanese Patent Laid-Open No. 2009-249089 has a paper returning claw to perform a stable feeding operation. With this configuration, even when a sheet is staying near the separating mechanism, which may cause overlap feeding, an operation of the paper returning claw disposed on a sheet conveying path is appropriately controlled using a clutch or the like, so that a front end of the sheet is pushed back to an upstream side by the returning claw, and further to a sheet placing portion. This enables a continuous, stable feeding operation without overlap feeding.

In a sheet carrier of Japanese Patent Laid-Open No. 2001-199559, after separation by a separating mechanism, the side restricting plates are moved, and a press contact of the friction member with the separation roller, which form the separating mechanism, is canceled. Then, based on the positional information of the side end of the documents, which is detected by a document side end detecting sensor provided on the side restricting plates, the movement of the side restricting plates is stopped. With this configuration, it is possible to prevent skew feeding or jamming of a sheet, irrespective of a positional variation of the side restricting plates or the variation in a sheet size.

However, in these conventional sheet feeding devices, due to the following reasons, skew feeding or jamming has occurred during sheet conveyance, and cost has been increased.

That is, in the paper feeder of Japanese Patent Laid-Open No. 2009-249089, skew feeding during manual feeding is maintained by a side regulation plate provided on a stack tray and rigidity of the sheet. However, this depends on the rigidity, variations in a size width, and displacement of the stacking position of the stacked sheet, or an operation state of the side regulation plate by a user, inhibiting sufficient prevention of skew feeding. In some cases, feeding without regulation of the side regulation plate may cause skew feeding, jamming, wrinkles, scratches, or the like.

On the other hand, in the sheet carrier disclosed in Japanese Patent Laid-Open No. 2001-199559, although it is possible to prevent skew feeding of a sheet, a position detecting portion and a moving portion for the side restricting plates are required, increasing cost.

Accordingly, it is desirable to prevent damage, wrinkles, scratches, jamming of a sheet due to skew feeding or rotation (fan) of the sheet during feeding of the stacked sheet, and to suppress a cost increase.

SUMMARY OF THE INVENTION

In order to achieve the above, a sheet feeding device according to the present invention includes: a stacking member on which a sheet is stacked; a first conveying portion that conveys a sheet stacked on the stacking member; a second conveying portion that separates and conveys a sheet conveyed by the first conveying portion; a stopper member that stops a sheet whose front end is abutted against the stopper member at an upstream of the second conveying portion in a sheet conveying direction, wherein the stopper member can be at a first position where the sheet can be stopped and a second position where the sheet can pass the stopper member, and wherein the stopper member can move from the first position toward the second position such that a sheet conveyed by the first conveying portion reaches the second conveying portion while maintaining a state where the front end of the sheet is abutted to the stopper member.

Further features of the present invention will become apparent from the following description of exemplary embodiments with reference to the attached drawings.

BRIEF DESCRIPTION OF THE DRAWINGS

FIGS. 5A to 5F are explanatory cross-sectional views of a skew feeding correction operation by the return projection according to Example 1.

DESCRIPTION OF THE EMBODIMENTS

An exemplary embodiment of the present invention is exemplarily described in detail below with reference to the drawings. However, the dimensions, materials, shapes, relative positions, and the like of the components described in the following embodiments should be appropriately changed according to the configuration of the apparatus to which the present invention is applied and various conditions, and are not intended to limit the scope of the invention to only these.

EXAMPLE 1

Figure 1:
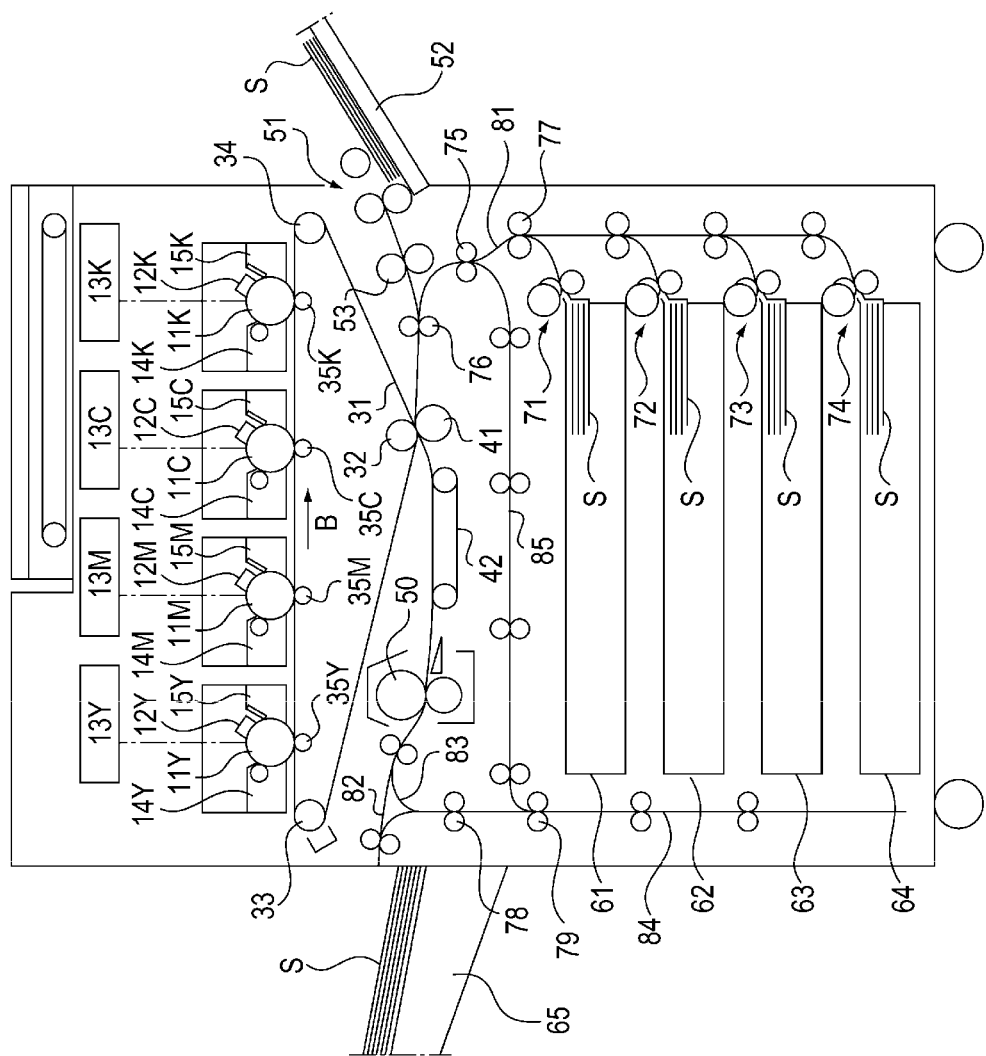
FIG. 1 is a schematic sectional view of an image forming apparatus according to Example 1.

FIG. 1 is a schematic sectional view of an image forming apparatus provided with a sheet feeding device. In this example, a color image forming apparatus using an electrophotographic system is exemplified as the image forming apparatus. In addition, as the image forming apparatus, from an advantage of excellent adaptability to various kinds of sheets and excellent print productivity, exemplified is an image forming apparatus of an intermediate transfer tandem system in which image forming portions of four colors are arranged side by side on an intermediate transfer belt.

<1. Sheet Conveying Process>

A sheet S is placed to be stacked on a manual feeding stack tray (stacking member) 52 and sheet storage cases (stacking members) 61 to 64. The sheet S is fed by any one of feeding portions 51, 71 to 74 as the sheet feeding device, according to a timing of image formation.

An operation of the feeding portion 51 as the sheet feeding device will be described later in detail. The sheet S fed by any one of the feeding portions 51, 71 to 74 passes a vertical conveying path 81, and is conveyed to a pair of resist rollers 76. The pair of resist rollers 76 has a function to align a front end of the sheet S and correct skew feeding by abutting with the conveyed sheet S to create a loop. Further, the pair of resist rollers 76 has a function to convey the sheet S to a secondary transfer portion at a predetermined timing according to the timing of image formation on the sheet S, that is, according to a toner image carried on an image bearing member. The pair of resist rollers 76 feeds the sheet S to the secondary transfer portion at a desired timing after correcting skew feeding. The secondary transfer portion is a toner-image-transfer nip portion to the sheet S, formed by a secondary transfer inner roller 32 and a secondary transfer outer roller 41 that are opposed to each other, and applies a predetermined pressure and an electrostatic load bias to transfer the toner image onto the sheet S.

<2. Image Creating Process>

There will be described a forming process of an image sent to the secondary transfer portion at a same timing as the conveying process of the sheet S to the secondary transfer portion described above. The image forming portion mainly includes a photosensitive drum 11 (11Y, 11M, 11C, 11K) as an image bearing member (photoreceptor), a charging device 12 (12Y, 12M, 12C, 12K), an exposure device 13 (13Y, 13M, 13C, 13K), a developing device 14 (14Y, 14M, 14C, 14K), a primary transfer unit 35 (35Y, 35M, 35C, 35K), and a photoreceptor cleaner 15 (15Y, 15M, 15C, 15K). A surface of the photosensitive drum 11 is uniformly charged by the charging device 12 in advance. The charged photosensitive drum 11 is exposed by the exposure device 13 on the basis of a signal of image information, and a latent image is formed. An electrostatic latent image formed on the photosensitive drum 11 is visualized as a toner image on the photosensitive drum 11 through toner development by the developing device 14. Then, the predetermined pressure and the electrostatic load bias are applied by the primary transfer unit 35, and the toner image formed on the photosensitive drum 11 is transferred onto the intermediate transfer belt 31. After that, transfer residual toner slightly left on the photosensitive drum 11 is collected by the photoreceptor cleaner 15, and the photosensitive drum 11 is prepared again for the next image formation. In FIG. 1, there are four sets of the image forming portions described above, which are yellow (Y), magenta (M), cyan (C), and black (Bk). Of course, a number of colors is not limited to four colors, and an order of colors is also not limited to this.

Next, the intermediate transfer belt 31 will be described. The intermediate transfer belt 31 is stretched by rollers, such as a driving roller 33, a tension roller 34, and the secondary transfer inner roller 32, and is conveyed and driven in a direction of arrow B in the figure. The image forming processes of the individual colors, which are processed in parallel by the yellow (Y), magenta (M), cyan (C), and black (Bk) image forming portions described above, are performed at a timing when being superposed on the toner image of an upstream color primarily transferred onto the intermediate transfer belt 31. As a result, a full-color toner image is finally formed on the intermediate transfer belt 31, and conveyed to the secondary transfer portion.

<3. Processes after Secondary Transfer>

By the conveying process and the image forming process of the sheet S respectively described above, the full-color toner image is secondarily transferred onto the sheet S at the secondary transfer portion. Then, the sheet S is conveyed to a fixing device 50 by a pre-fixing conveying apparatus 42. The fixing device 50 fixes the toner image by fusing onto the sheet S by applying a predetermined pressure with opposing rollers or belts, and a heating effect of a heat source such as a heater in general. To convey the sheet S having the fixed image thus obtained, a path is to be selected either of a discharge conveying path 82 to discharge onto a discharge tray 65 as it is, or a reverse introduction path 83 when double-sided image formation is required. When double-sided image formation is required, the sheet S is drawn into a switch-back path 84 from the reverse introduction path 83, the front and rear ends are switched by an operation of normally/reversely rotating a rotational direction of a pair of reverse rollers 79 (switchback operation), and the sheet S is conveyed to a duplex conveying path 85. Then, the sheet S re-merges at a matched timing with a sheet S of a succeeding job, which is conveyed from each of the feeding portions 71 to 74, and is similarly sent to the secondary transfer portion via the pair of resist rollers 76. Since the image forming process on a back side (second side) of the sheet is same as that of a front side (first side) of the sheet described above, the description is omitted. For reversing and ejecting the sheet S, the sheet S is, after passing the fixing device 50, drawn into the switch-back path 84 from the reverse introduction path 83. Then, the sheet S is taken out in an opposite direction to the feeding direction with the rear end in the feeding as the front end, by a reverse rotation of the pair of reverse rollers 78, and is discharged to the discharge tray 65.

<4. Configuration of Manual Feeding Portion Having Return Projection>

Next, as the sheet feeding device according to this example, the feeding portion 51 in a manual feeding portion will be described by way of example.

Figure 2:
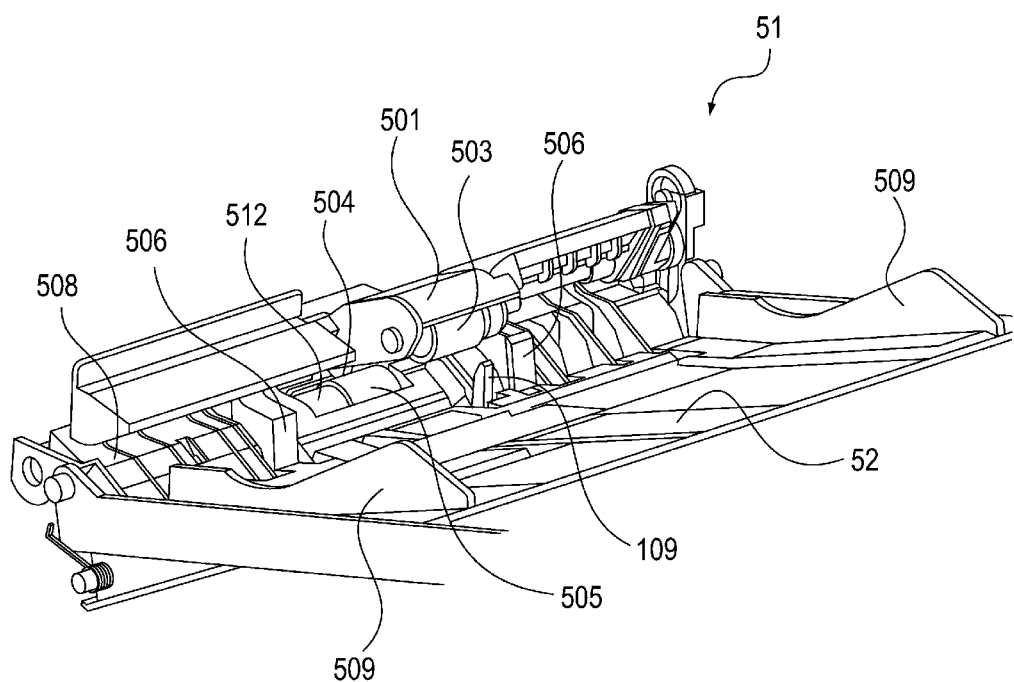
FIG. 2 is a schematic perspective view illustrating a configuration of a manual feeding portion according to Example 1.
Figure 3:
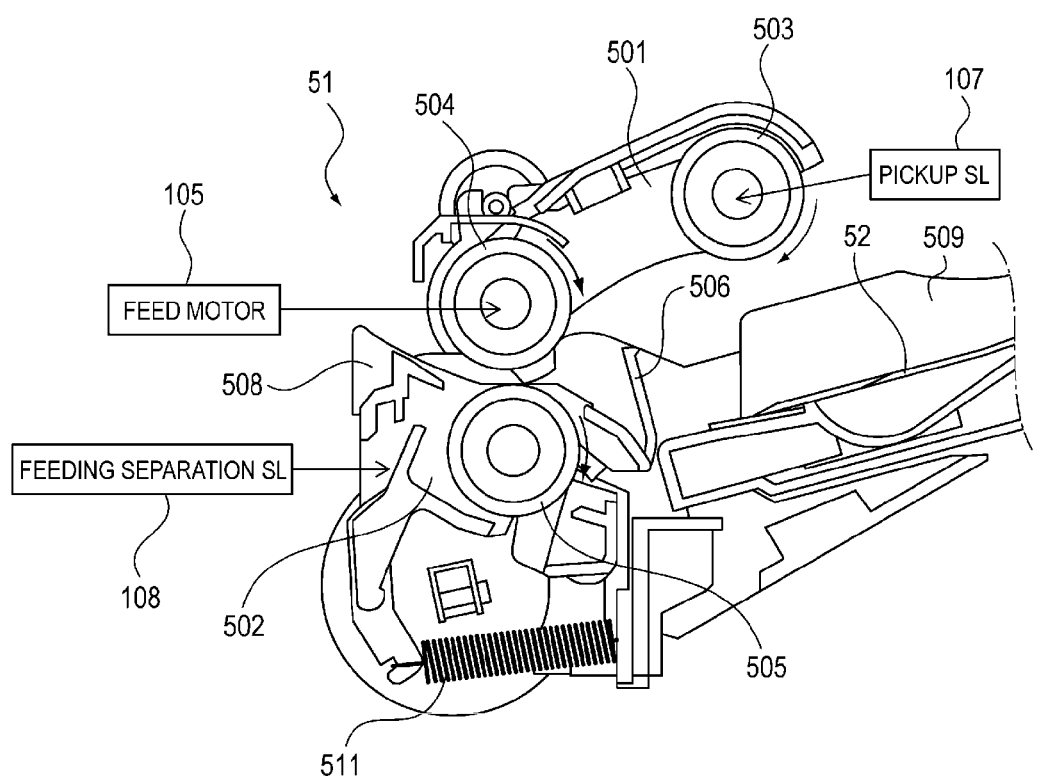
FIG. 3 is a schematic cross-sectional view illustrating a configuration of the manual feeding portion according to Example 1.
Figure 4:
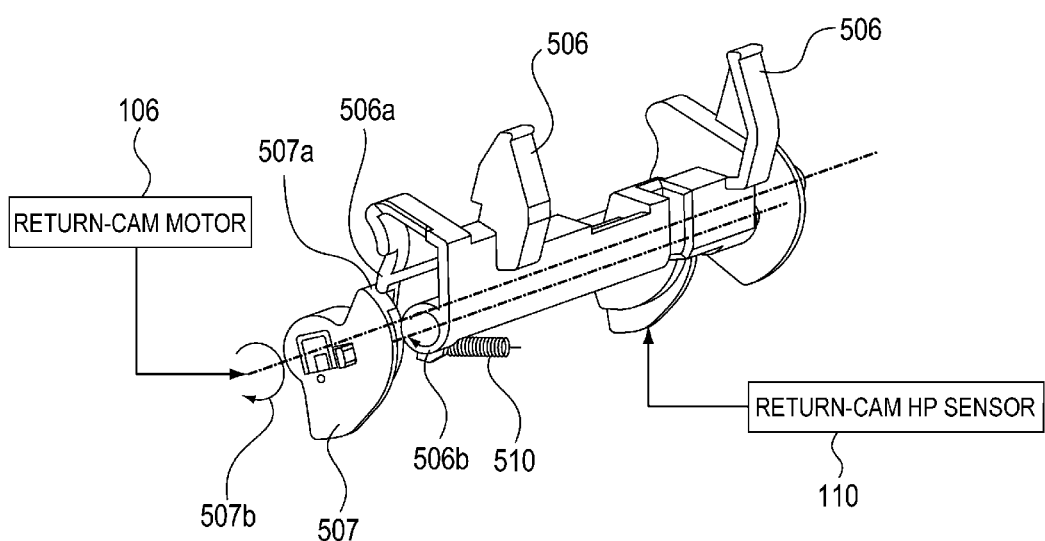
FIG. 4 is a perspective view illustrating a relationship between a return projection and a return cam according to Example 1.

FIGS. 2 and 3 are a schematic perspective view and a schematic cross-sectional view illustrating a configuration of the manual feeding portion according to this example. FIG. 4 is a perspective view illustrating a relationship between a return projection and a return cam.

A pickup roller 503 is rotatably held by a pickup arm 501, and abutted to an uppermost sheet S stacked on the stack tray 52 with a predetermined pressure or separated from the uppermost sheet S by a link (not illustrated) connected to a pickup SL 107. A feed roller 504 is rotatably held by a feeding frame 508. A separation roller 505 is rotatably held by a separation holder 502 via a torque limiter 512. The separation holder 502 is swingably supported by the feeding frame 508, and is energized by a separation spring 511. This causes the separation roller 505 to be abutted to the feed roller 504 with a predetermined pressure. Further, the separation roller 505 can be separated from the feed roller 504 by a link (not illustrated) connected to a feeding separation SL 108.

The pickup roller 503, the feed roller 504, and the separation roller 505 are rotated in respective arrow directions in FIG. 3 by rotational driving of a feed motor 105 being transmitted via a drive train (not illustrated). The pickup roller 503 is a first conveying portion that conveys a sheet stacked on the stack tray 52. A rotational direction (arrow direction) of the separation roller 505 illustrated in FIG. 3 indicates a rotational direction when the separation roller 505 is separated from the feed roller 504. The separation roller 505 is, when abutted to the feed roller 504, rotated in a rotational direction of the feed roller 504 (opposite to the arrow direction) via the torque limiter, to nip and convey the sheet S. At the same time, when two or more sheets are nipped, the separation roller 505 is rotated in the direction (arrow direction) opposite to the rotational direction of the feed roller 504, to return the sheet to the stack tray side, preventing overlap feeding of the sheet S. The feed roller 504 and the separation roller (separating member) 505 form a second conveying portion that individually separates and conveys the sheet conveyed by the pickup roller 503.

A return projection 506 is a stopper member that can advance and retreat with respect to a sheet conveying path in order to stop a front end of a sheet in a sheet conveying path between the pickup roller 503 and the feed roller 504. In addition, the return projection 506 is a loading reference member that regulates a position by abutting with a front end of a sheet when the sheet is stacked on the stack tray. The return projection 506 is swingably supported by the feeding frame 508, and is energized by the return spring 510 in a direction of arrow 506*b* in FIG. 4.

(A cam abutting portion 506*a* of) the return projection 506 abuts to a cam surface 507*a* of the return cam 507 rotatably held by the feeding frame 508, and is rotated in a direction of arrow 507*b* in the figure by rotational driving of a return-cam motor 106. When the return cam 507 is rotated once, the return projection 506 oscillates to a standby position illustrated in FIGS. 3 and 4, and a retracting position retracted from the sheet conveying path of the feed roller 504. The standby position of the return projection 506 illustrated in FIGS. 3 and 4 is a position that protrudes into the sheet conveying path between the pickup roller 503 and the feed roller 504 with respect to the retracting position retracted from the sheet conveying path, to stop a sheet fed out by the pickup roller 503. This standby position can be detected by a return-cam HP sensor 110 that detects a rotational position of the return cam 507. The return cam 507 forms a moving portion that moves the return projection 506 to the standby position protruding with respect to the sheet conveying path, and to the retracting position retracted from the sheet conveying path. The return cam 507 is a cam member that abuts to the return projection 506 and moves the return projection 506 to the standby position protruding with respect to the sheet conveying path, and to the retracting position retracted from the sheet conveying path. The return projection 506 positioned at the standby position (first position) can stop a front end of a sheet. When the return projection 506 is positioned at the retracting position (second position) retracted from the sheet conveying path, the sheet can pass the return projection 506.

<5. Skew Feeding Correction by Return Projection>

Next, skew feeding correction by the return projection in this example will be described.

FIGS. 5A to 5F and 6A to 6F are explanatory views of a cross section and a plane of a skew feeding correction operation by the return projection 506. FIGS. 5A to 5F and 6A to 6F illustrate an operation of the sheet S at a same timing.

Operation A

Figure 6A:
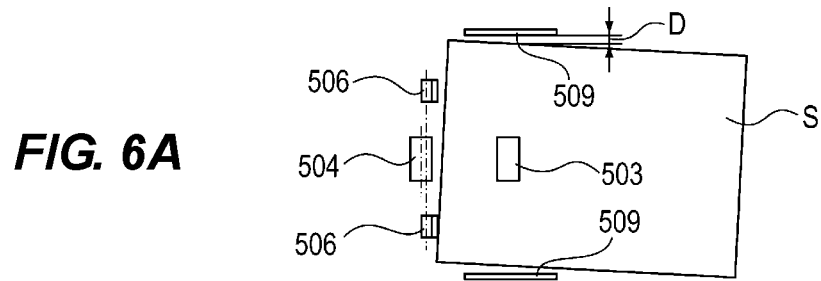
FIGS. 6A to 6F are explanatory plan views of the skew feeding correction operation by the return projection according to Example 1.
Figure 6B:
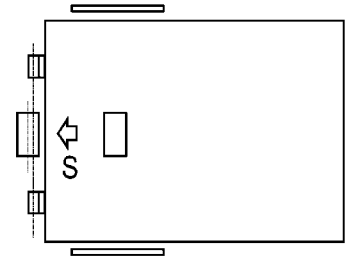
Figure 6C:
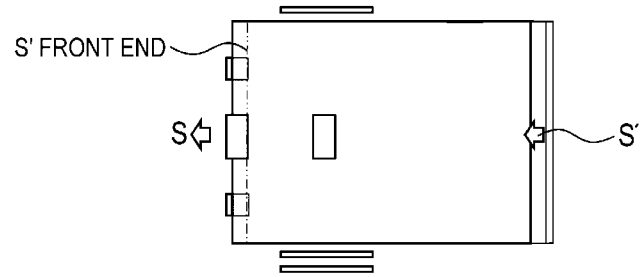
Figure 6D:
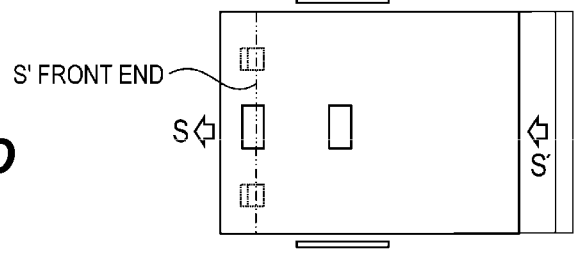
Figure 6E:
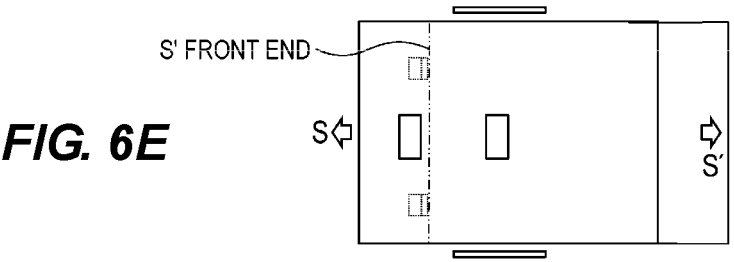
Figure 6F:
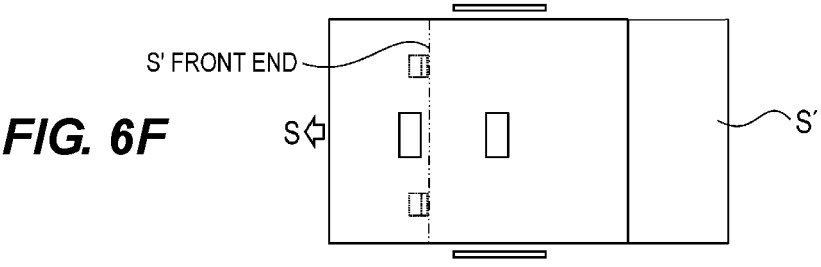

The sheet S is stacked on the stack tray 52, and a side regulation plate 509 is moved in a width direction orthogonal to a feeding direction according to the size of the sheet S. Here, as illustrated in FIG. 6A, the movement of the side regulation plate 509 depends on a user, and in some cases, a gap D is left between the side regulation plate 509 and a side end of the sheet S, leaving the sheet S in a state being obliquely stacked. In this state, while the pickup roller 503 is separated from the uppermost sheet S, the front end of the sheet S partially abuts to the return projection 506 at the standby position.

Operation B

The uppermost sheet S is abutted with the pickup roller 503 by the pickup SL 107 and conveyed in a direction of arrow b in the figure by the pickup roller 503, and the front end of the sheet S follows an abutment surface of the return projection 506 at the standby position, correcting skew feeding.

Operation C

Following the return cam 507 rotated by the return-cam motor 106, the return projection 506 starts to rotate in the feeding direction (direction of arrow X in FIG. 5C) in which a sheet is guided to a nip between the feed roller 504 and the separation roller 505. This results in guiding the sheet S to the nip between the feed roller 504 and the separation roller 505 while maintaining the state of correcting skew feeding with the pickup roller 503 and the return projection 506. At this time, a lower sheet S' is dragged by the uppermost sheet S and stays near the nip of the feed roller 504.

Operation D

While skew feeding is kept being corrected, the sheet S guided to the nip between the feed roller 504 and the separation roller 505 is nipped and conveyed by the feed roller 504 and the separation roller 505. At this time, the return projection 506 further rotates in the feed direction (direction of arrow X in FIG. 5D), and a front end of the return projection 506 moves to the retracting position retracted from the conveying path of the sheet S.

Operation E

When the sheet S is conveyed by a predetermined amount by the feed roller 504 and the separation roller 505, the pickup roller 503 is separated from the sheet S by the pickup SL 107, and the separation roller 505 is separated from the feed roller 504 by the feeding separation SL 108. Simultaneously, following the return cam 507 rotated once by the return-cam motor 106, the return projection 506 rotates in a returning direction in which a sheet is returned from near the nip between the feed roller and the separation roller toward the pickup roller. Namely, the return projection 506 rotates in a direction (direction of arrow Y in FIG. 5E) opposite to the feeding direction (direction of arrow X in FIGS. 5D and 5E), and returns to the standby position of the return projection 506 while hooking and pulling back a front end of a lower sheet S' staying near the nip of the feed roller 504, which may cause overlap feeding. In this way, the return projection 506 as the stopper member is a separating member that returns a lower sheet other than the uppermost sheet toward the stack tray when a plurality of sheets is conveyed in the sheet conveying path between the pickup roller 503 and the feed roller 504.

Operation F

The separation roller 505 is abutted to the feed roller 504 by the feeding separation SL 108 to convey the sheet S to a pair of downstream conveying rollers 53, and the feeding operation of the uppermost sheet S is completed.

<6. Control of Skew Feeding Correction by Return Projection>

Next, control of the skew feeding correction by the return projection in this example will be described in detail with reference to FIGS. 7 and 8.

Figure 7:
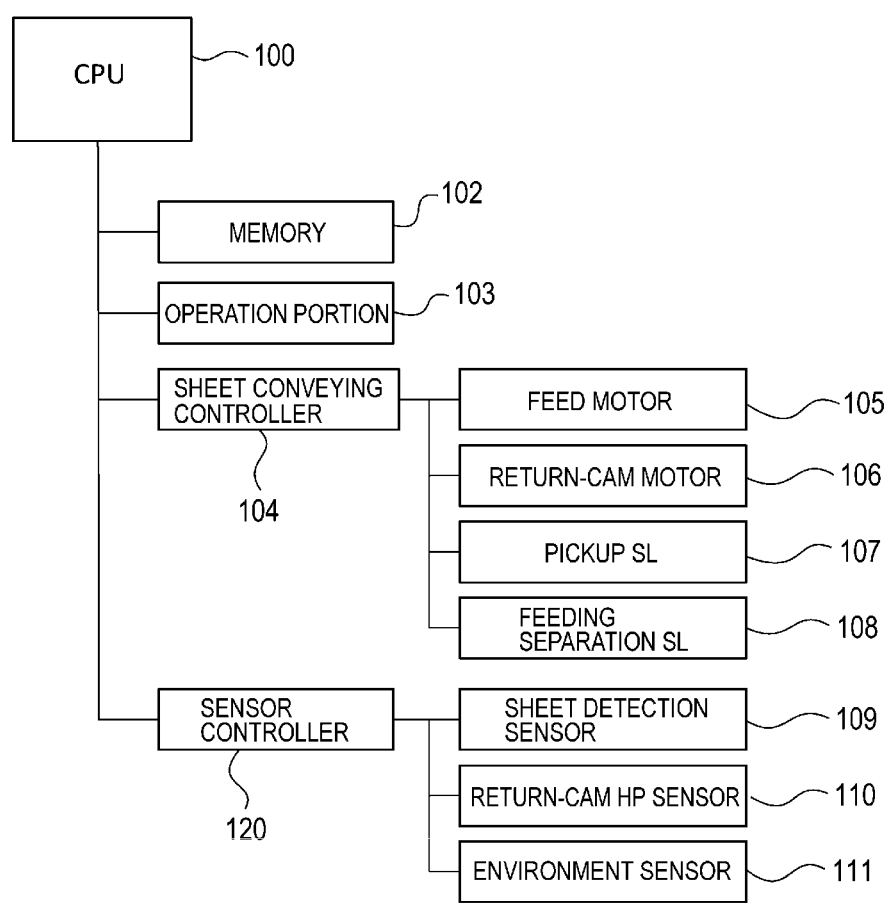
FIG. 7 is a block diagram of a sheet feeding device according to Example 1.

FIG. 7 is a block diagram for describing a controller of the sheet feeding device according to this example.

As illustrated in FIG. 7, a CPU 100 has functional sections such as a memory 102, an operation portion 103, a sheet conveying controller 104, a sensor controller 120, and the like. By executing a predetermined control program and the like, the CPU 100 realizes various processes performed by the sheet feeding device in this example. The memory 102 is, for example, a RAM or a ROM, and stores various programs and various data in a predetermined storage area. The operation portion 103 receives various kinds of information such as size information, basis weight information, or surface property information, which relates to a sheet used by a user, and various operations performed by the user, such as an instruction for executing a conveyance or interrupting the conveyance.

The sheet conveying controller 104 drives and controls the feed motor 105, the return-cam motor 106, the pickup SL (first solenoid) 107, and the feeding separation SL (second solenoid) 108, and controls skew feeding correction, which is described later, based on input information of the sheet detection sensor 109, the return-cam HP sensor 110, and an environment sensor 111 of the sensor controller 120.

Figure 8:
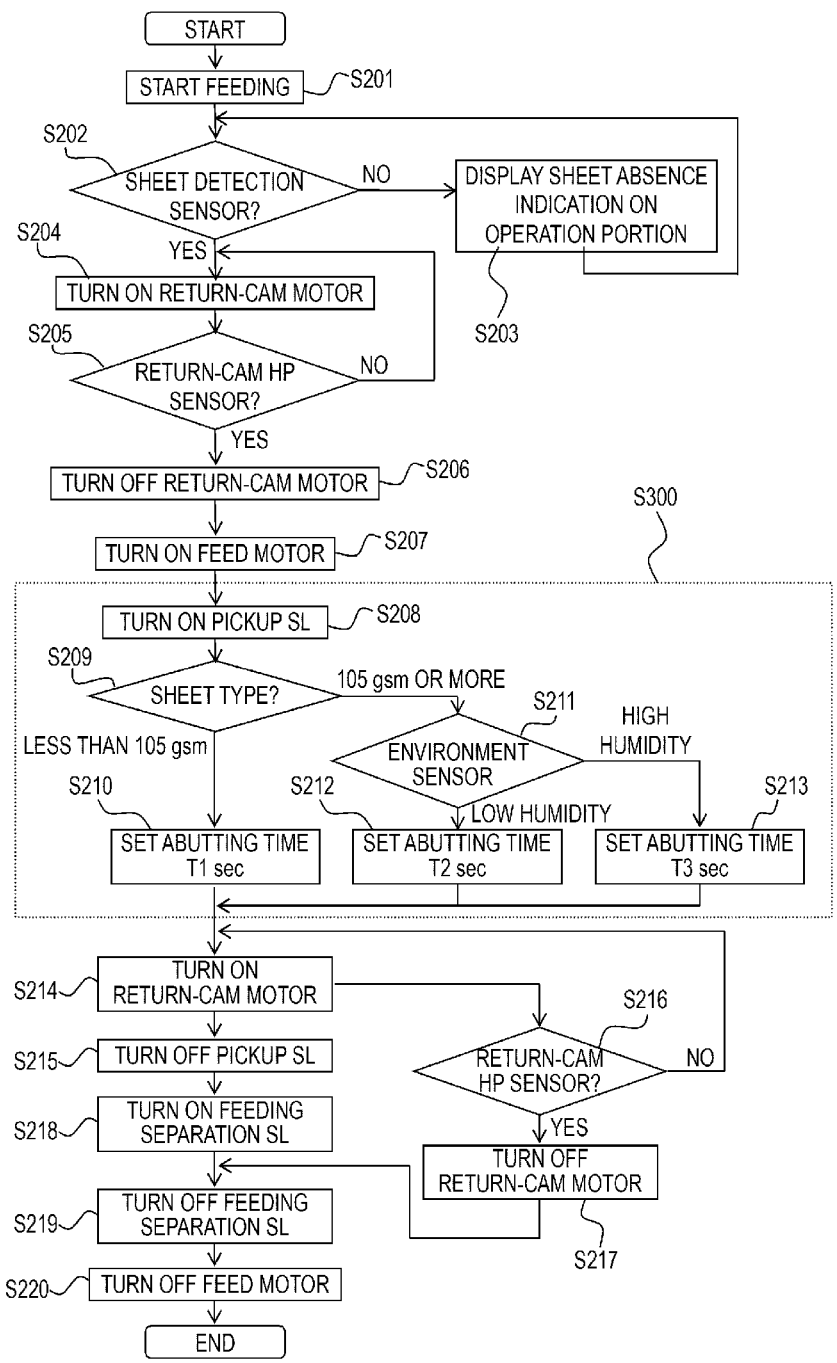
FIG. 8 is a flowchart of the sheet feeding device according to Example 1.

FIG. 8 is a flowchart for the control of the skew feeding correction by the return projection in this example.

As illustrated in FIG. 8, at START of the feeding, feeding of the sheet S is started according to the instruction of the CPU 100 (S201). First, the sheet detection sensor 109 detects the presence or absence of the sheet S on the stack tray (S202). If the sheet S is not detected, a sheet absence indication (S203) is displayed on the operation portion. When the sheet S on the stack tray is detected, the return-cam motor 106 is driven (S204), and the return-cam HP sensor 110 moves the return projection 506 to the standby position (S205, S206). The feed motor 105 is driven (S207) to drive the pickup SL 107, and the pickup roller 503 starts a pickup operation of the sheet S (S208). The sheet S is sequentially conveyed to a downstream side, and pre-resist conveyance is started.

From user input information from the operation portion 103 and the detection information of the environment sensor 111, times T1 to T3, which are times for abutting the front end of the sheet S to the abutment surface of the return projection 506, are determined (S209 to S213), based on a predetermined reference value of a sheet type and humidity as information relating to a sheet. Here, when the sheet type (basis weight in this case) is less than 105 gsm, abutting time T1 sec is determined (set). When the sheet type is 105 gsm or more in low humidity, abutting time T2 sec is determined (set). When the sheet type is 105 gsm or more in high humidity, abutting time T3 sec is determined (set). Here, a relationship between abutting times T1 to T3 is T1<T3<T2. While 105 gsm is used as the reference value of the sheet type in this case, the reference value is not limited to this. Moreover, the reference value of humidity is set to 70%, the humidity equal to or less than the reference value is defined as low humidity, and the humidity more than the reference value is defined as high humidity, but the humidity reference value is also not limited to this. These reference values may be set to values at which skew feeding can be appropriately corrected. In addition, the abutment time here is a time in which the rotation of the pickup roller causes the front end of the sheet to follow the abutment surface of the return projection staying at the standby position to correct skew feeding, which is a time until the return projection starts to rotate in the feeding direction from the standby position. This makes it possible to sufficiently correct skew feeding of the sheet S to be used depending on a situation, when the sheet S is stacked on the stack tray 52.

Then, the return-cam motor 106 is driven (S214), and the return-cam HP sensor 110 returns the return projection 506 to the standby position (S216, S217). During the one rotation operation of the return cam, while an attitude correcting skew feeding of the sheet S is maintained, the conveyance to the nip between the feed roller 504 and the separation roller 505 is controlled, the front end of the return projection 506 is once retracted from the conveying path of the sheet S, and then pulls back the front end of the sheet S' lower than the sheet S to prevent overlap feeding. The driving of the pickup SL 107 is turned off (S215) at a timing of returning the return projection 506 from the retracting position to the standby position, the feeding separation SL108 is driven (S218), the pickup roller 503 is separated from the sheet S, and the separation roller 505 is separated from the feed roller 504.

After the return projection 506 is returned to the standby position, the driving of the feeding separation SL 108 is turned off (S219), the separation roller 505 is abutted to the feed roller 504 to convey the uppermost sheet S to the pair of downstream conveying rollers 53, the driving of the feed motor 105 is turned off (S220), and the feeding operation is completed.

While a manual feeding unit that separates and feeds a sheet from the manual feeding stack tray has been described by way of example in this example, the feeding portion is not limited to this. The present invention may be applied to a feeding portion that separates and feeds a sheet from a storage case detachably attachable to a main body of the image forming apparatus.

As described above, during conveyance of the pickup roller 503, skew feeding of the sheet S can be generally corrected before conveyance of the feed roller 504, by conveying the sheet while abutting to the return projection 506 that separates and returns a sheet that may cause overlap feeding. Further, the return projection 506 rotates following the return cam 507 to guide the sheet to the nip between the feed roller 504 and the separation roller 505 while maintaining the above described state of the sheet. This prevents deterioration of printing accuracy due to skew feeding or rotation (fan) of the sheet, and improves image quality. Accordingly, it is possible to prevent damage, wrinkles, scratches, jamming of a sheet during feeding of the stacked sheet. In addition, the position detecting portion and the moving portion of the regulating plate as in the conventional one are not required, which can also suppress a cost increase.

EXAMPLE 2

Next, an image forming apparatus provided with a sheet feeding device according to Example 2 will be described. While the schematic configuration of the sheet feeding device and the image forming apparatus are substantially the same as those of the above-described example, members having equivalent functions are denoted by the same reference numerals, and the description is omitted.

In the following description, the configuration of a manual feeding unit having a return projection, which is a characteristic part of this example, will be described.

Figure 9:
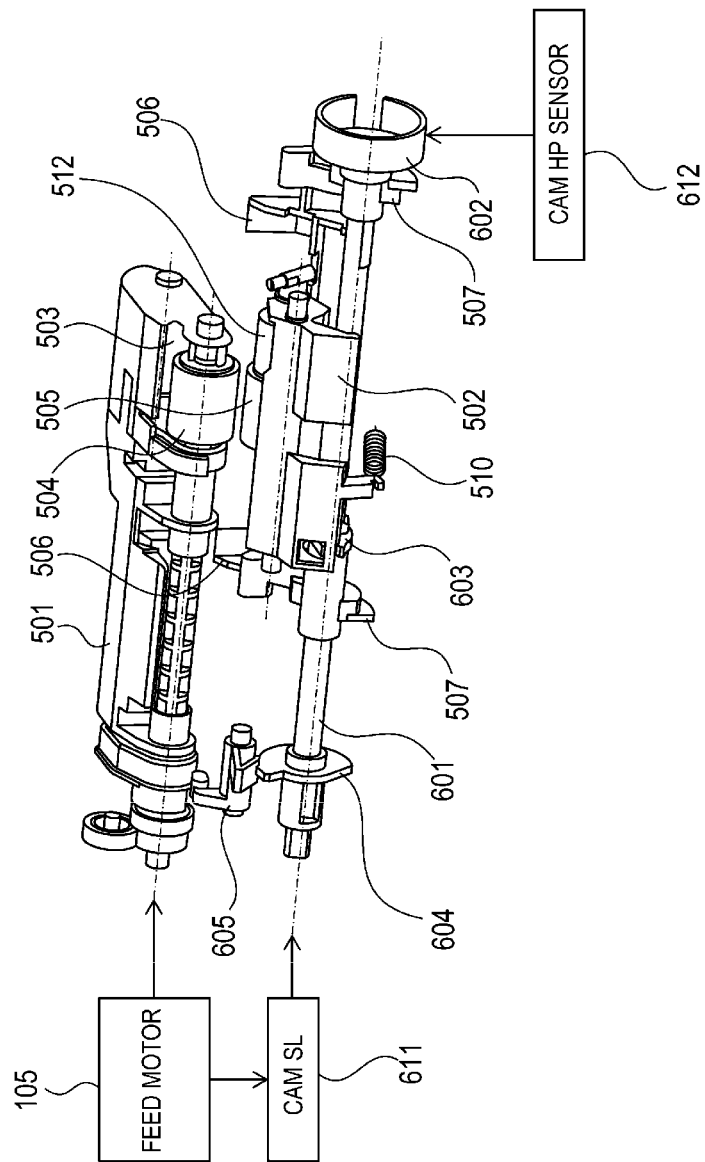
FIG. 9 is a perspective view illustrating a relationship between a return projection and a return cam according to Example 2.

FIG. 9 is a perspective view that illustrates a relationship between cams, which integrally control abutting/separating between a pickup roller 503 and a sheet S, abutting/separating between a separation roller 505 and the feed roller 504, and an oscillating action of a return projection 506; and the pickup roller 503, the separation roller 505, and the return projection 506.

In FIG. 9, the pickup roller 503 is rotatably held by a pickup arm 501. By one rotation operation of a pickup cam 604 provided to a camshaft 601, the pickup roller 503 is abutted to an uppermost sheet S stacked on a stack tray 52 for a predetermined period of time with a predetermined pressure, and separated from the sheet S, by the pickup arm 501 via a link 605. The pickup cam 604 is a first cam that abuts the pickup roller 503 to a sheet stacked on the stack tray for a predetermined period of time, and separates the pickup roller 503 from the sheet.

The separation roller 505 is rotatably held by a separation holder 502 via a torque limiter 512 fixed to the separation holder 502. The separation holder 502 is swingably supported by a feeding frame 508, and is energized by a separation spring (not illustrated). This causes the separation roller 505 to be abutted to the feed roller 504 with a predetermined pressure. Further, the separation roller 505 can be separated from the feed roller 504 for a predetermined time by one rotation operation of a separation cam 603 provided to the camshaft 601. The separation cam 603 is a second cam that separates the feed roller 504 from the separation roller 505, which form the second conveying portion, for a predetermined time.

The rotational driving of the feed motor 105 is transmitted to the pickup roller 503 and the feed roller 504 via a driving train (not illustrated), and is transmitted to the camshaft 601 via the cam SL 611. While abutting to the feed roller 504, the separation roller 505 follows a rotational direction of the feed roller 504 via the torque limiter 512, and nips and conveys the sheet S. If overlap feeding of the sheet S occurs, the separation roller 505 stops the rotation of the separation roller 505 to prevent the overlap feeding.

The return projection 506 oscillates to a standby position and a retracting position, similarly to Example 1 described above, by one rotation operation of a return cam 507 provided to the camshaft 601. As with the example described above, the return cam 507 is a cam member forming a moving portion that moves the return projection 506 to the standby position protruding with respect to the sheet conveying path, and to the retracting position retracted from the sheet conveying path. Further, the moving portion includes the pickup cam (first cam) 604 that abuts and separates the pickup roller 503 described above, and the separation cam (second cam) 603 that abuts and separates between the feed roller 504 and the separation roller 505. Further, the camshaft 601 is provided with an HP detection flag 602 and a cam HP sensor 612 that detect a home position (HP) of the camshaft. Other configurations are the same as that of Example 1 described above.

Next, an example of control of skew feeding correction in this example will be described in detail with reference to FIGS. 10 and 11.

Figure 10:
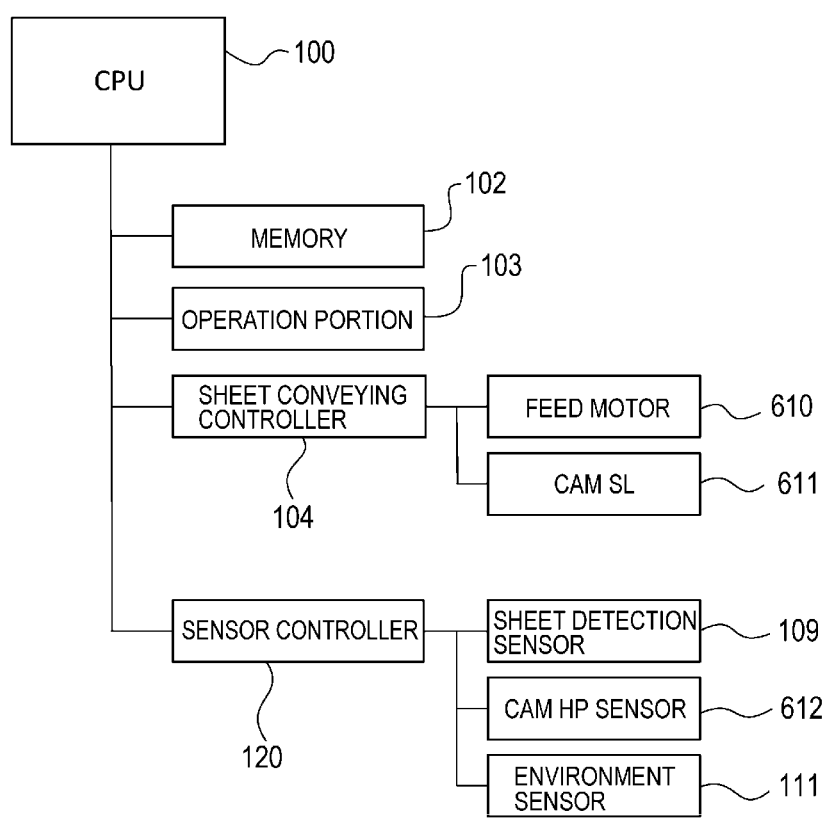
FIG. 10 is a block diagram of a sheet feeding device according to Example 2.

FIG. 10 is a block diagram for describing a controller of the sheet feeding device according to this example.

As illustrated in FIG. 10, a CPU 100 has functional sections such as a memory 102, an operation portion 103, a sheet conveying controller 104, a sensor controller 120, and the like. By executing a predetermined control program and the like, the CPU 100 realizes various processes performed by the sheet feeding device in this example. The memory 102 is, for example, a RAM or a ROM, and stores various programs and various data in a predetermined storage area. The operation portion 103 receives various kinds of information such as size information, basis weight information, or surface property information, which relates to a sheet used by a user, and various operations performed by the user, such as an instruction for executing a conveyance or interrupting the conveyance.

The sheet conveying controller 104 drives and controls a feed motor 610 and a cam SL 611, and controls skew feeding correction, which is described later, based on input information of the sheet detection sensor 109, the cam HP sensor 612, and the environment sensor 111 of the sensor controller 120.

Figure 11:
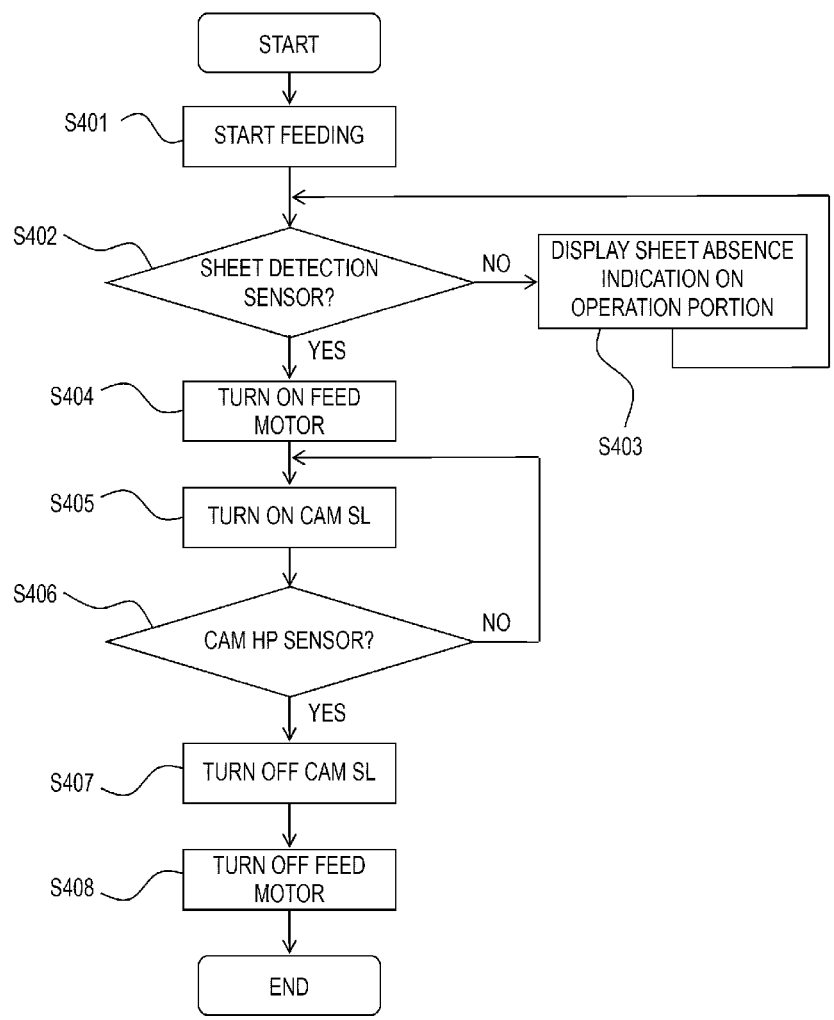
FIG. 11 is a flowchart of the sheet feeding device according to Example 2.

FIG. 11 is a flowchart for the control of the skew feeding correction by the return projection in this example.

As illustrated in FIG. 11, at START of the feeding, feeding of the sheet S is started according to the instruction of the CPU 100 (S401). First, the sheet detection sensor 109 detects the presence or absence of the sheet S on the stack tray (S402). If the sheet S is not detected, a sheet absence indication (S403) is displayed on the operation portion. When the sheet S on the stack tray is detected, the feed motor 610 is driven (S404), and after a predetermined time, the cam SL 611 is driven (S405). Based on the detection information of the cam HP of the cam HP sensor 612 (S406), the camshaft 601 makes one rotation (S407). This rotation operation causes an operation of the pickup cam 604, the separation cam 603, and the return cam 507 that are provided to the camshaft 601, performing control of skew feeding correction in which the return projection 506 is abutted with a front end of the sheet S for a predetermined abutting time.

After that, the separation operation of the pickup roller 503 and the separation roller 505, and the operation of the return projection 506 are sequentially performed similarly to Example 1 described above. After the return projection 506 returns from the retracting position to the standby position, the separation roller 505 abuts to the feed roller 504 and conveys the sheet to a pair of downstream conveying rollers 53, the driving of the feed motor 610 is turned off (S408), and the feeding operation is completed.

In this example, on a camshaft 601 provided with a return cam 507 that moves the return projection 506 to the standby position and the retracting position, there are provided the pickup cam (first cam) 604 that abuts and separates the pickup roller 503, and the separation cam (second cam) 603 that abuts and separates between the feed roller 504 and the separation roller 505. Namely, the moving portion has the return cam 507, the pickup cam 604, and the separation cam 603. For this reason, in this example, a return-cam motor 106 and a feeding separation SL 108 illustrated in FIG. 7 in Example 1 are not required, and the control of the abutting time required for skew feeding correction of the sheet S (S300) illustrated in FIG. 8 is also not required. Therefore, according to this example, it is possible not only to obtain the same effect as the above-described example but also to correct skew feeding with an inexpensive configuration.

OTHER EXAMPLES

While the sheet feeding device integrally provided by the image forming apparatus is exemplified in the above-described examples, the present invention is not limited to this.

For example, it may be a sheet feeding device detachably attachable to the image forming apparatus, and the same effect can be obtained by applying the present invention to the sheet feeding device. Further, while a feeding portion (manual feeding portion) that separates and feeds a sheet from the manual feeding stack tray has been described by way of example as the sheet feeding device in the above-described example, the present invention is not limited to this. The same effect can be obtained by applying the present invention to a feeding portion that separates and feeds a sheet from a storage case detachably attachable to a main body of the image forming apparatus.

Further, while the sheet feeding device that separates and feeds a sheet such as a recording sheet to be recorded is exemplified in the above-described example, the present invention is not limited to this. For example, the same effect can be obtained by applying the present invention to a sheet feeding device that separates and feeds a sheet such as an original to be read.

While a printer is exemplified as the image forming apparatus in the above-described example, the present invention is not limited to this. For example, other image forming apparatuses, such as copying machines or facsimile machines, or other image forming apparatuses such as multifunction machines combining these functions maybe used. The same effect can be obtained by applying the present invention to a sheet feeding device used in these image forming apparatuses.

While the electrophotographic system is exemplified as the recording method in the above-described example, the present invention is not limited to this, and other recording method, such as an inkjet method, may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200581, filed Oct. 12, 2016, which is hereby incorporated by reference herein in its entirety.

What is claimed is:

1. A sheet feeding device comprising:
   a stacking member on which a plurality of sheets is stacked;
   a first conveying unit configured to convey an uppermost sheet stacked on the stacking member;
   a second conveying unit including a feed roller and a separating member, the second conveying portion being configured to convey the uppermost sheet conveyed by the first conveying unit, and the second conveying unit being configured to separate the uppermost sheet from the plurality of sheets if the first conveying unit conveys the plurality of sheets simultaneously;
   a plurality of stopper portions disposed at different positions in a direction perpendicular to the sheet conveying direction, the plurality of stopper members being configured to move from a first position toward a second position,
   wherein the first position is downstream of the first conveying unit and upstream of the second conveying unit,
   wherein, in a case where the plurality of stopper portions is located at the first position, a front end of the uppermost sheet conveyed by the first conveying unit is abutted against the plurality of stopper portions at the first position so to correct skew conveying of the uppermost sheet,
   wherein, in a case where the plurality of stopper portions is located at the second position, the uppermost sheet conveyed by the first conveying unit passes by the plurality of stopper portions, and
   wherein, in a case where the plurality of stopper portions is moved from the second position toward the first position, the first conveying unit separates from the uppermost sheet stacked on the stacking member and the separating member separates from the feed roller.

2. The sheet feeding device according to claim 1, further comprising a moving portion configured to move the plurality of stopper portions from the second position toward the first position.

3. The sheet feeding device according to claim 2, further comprising:
   a first solenoid configured to cause abutting or separating between the first conveying portion and a sheet stacked on the stacking member; and
   a second solenoid that configured to cause abutting or separating between the feed roller and the separating member,
   wherein, when the plurality of stopper portions is moved from the second position toward the first position by the moving portion, the first conveying unit separates from the uppermost sheet stacked on the stacking member by the first solenoid, and the separating member separates from the feed roller by the second solenoid.

4. The sheet feeding device according to claim 2, further comprising:
   a first cam configured to abut the first conveying unit to a sheet stacked on the stacking member for a predetermined period of time, and then separate the first conveying unit from the sheet; and
   a second cam configured to separate the feed roller and the separating member for a predetermined period of time.

5. The sheet feeding device according to claim 1, further comprising a moving portion configured to move the plurality of stopper portions,
   wherein the moving portion has a cam member that abuts to the plurality of stopper portions and moves the plurality of stopper portions.

6. The sheet feeding device according to claim 1, wherein the plurality of stopper portions is a loading reference member for a front end of a sheet on the stacking member.

7. The sheet feeding device according to claim 1, wherein a time for holding the stopper member at the first position is set according to information on sheet type.

8. The sheet feeding device according to claim 1, wherein the second conveying unit includes a feeding unit and separation unit, and
   wherein in the sheet conveying direction, the first position downstream of a positon where the first conveying unit contacts the uppermost sheet and upstream of a nip portion of the feeding unit and the separation unit.

9. An image forming apparatus comprising:
   a sheet feeding device that individually separates and feeds a sheet; and
   an image forming portion that forms an image on the fed sheet,
   the sheet feeding device comprising:
   a stacking member on which a plurality of sheets is stacked;
   a first conveying unit configured to convey an uppermost sheet stacked on the stacking member;

a second conveying unit including a feed roller and a separating member, the second conveying portion being configured to convey the uppermost sheet conveyed by the first conveying unit, and the second conveying unit being configured to separate the uppermost sheet from the plurality of sheets if the first conveying unit conveys the plurality of sheets simultaneously;

a plurality of stopper portions disposed at different positions in a direction perpendicular to the sheet conveying direction, the plurality of stopper members being configured to move from a first position toward a second position, wherein the first position is downstream of the first conveying unit and upstream of the second conveying unit, wherein, in a case where the plurality of stopper portions is located at the first position, a front end of the uppermost sheet conveyed by the first conveying unit is abutted against the plurality of stopper portions at the first position so to correct skew conveying of the uppermost sheet, wherein, in a case where the plurality of stopper portions is located at the second position, the uppermost sheet conveyed by the first conveying unit passes by the plurality of stopper portions, and wherein, in a case where the plurality of stopper portions is moved from the second position toward the first position, the first conveying unit separates from the uppermost sheet stacked on the stacking member and the separating member separates from the feed roller.

10. The image forming apparatus according to claim 9, further comprising a moving portion configured to move the plurality of stopper portions from the second position toward the first position.

11. The image forming apparatus according to claim 10, further comprising:
a first solenoid that abuts or separates configured to cause abutting or separating between the first conveying portion and a sheet stacked on the stacking member; and
a second solenoid that configured to cause abutting or separating between the feed roller and the separating member, wherein, when the plurality of stopper portions is moved from the second position toward the first position by the moving portion, the first conveying unit separates from the uppermost sheet stacked on the stacking member by the first solenoid, and the separating member separates from the feed roller by the second solenoid.

12. The image forming apparatus according to claim 10, further comprising:
a first cam configured to abut the first conveying unit to a sheet stacked on the stacking member for a predetermined period of time, and then separate the first conveying unit from the sheet; and
a second cam configured to separate the feed roller and the separating member for a predetermined period of time.

13. The image forming apparatus according to claim 9, further comprising a moving portion configured to move the plurality of stopper portions, wherein the moving portion has a cam member that abuts to the plurality of stopper portions and moves the plurality of stopper portions.

14. The image forming apparatus according to claim 9, wherein the plurality of stopper portions is a loading reference member for a front end of a sheet on the stacking member.

15. The image forming apparatus according to claim 9, wherein a time for holding the stopper member at the first position is set according to information on sheet type.

16. The image forming apparatus according to claim 9, wherein the second conveying unit includes a feeding unit and separation unit, and
wherein in the sheet conveying direction, the first position downstream of a positon where the first conveying unit contacts the uppermost sheet and upstream of a nip portion of the feeding unit and the separation unit.

* * * * *